United States Patent [19] [11] 3,771,143
Taylor [45] Nov. 6, 1973

[54] METHOD AND APPARATUS FOR PROVIDING ALTERNATE STORAGE AREAS ON A MAGNETIC DISK PACK

[75] Inventor: Warren I. Taylor, Bradbury, Calif.

[73] Assignee: Burroughs Corporation, Detroit, Mich.

[22] Filed: June 1, 1972

[21] Appl. No.: 258,615

[52] U.S. Cl. .......... 340/172.5, 340/174.1 B
[51] Int. Cl. .......... G06f 11/00
[58] Field of Search .......... 340/172.5, 146.1, 340/174.1 B

[56] References Cited

UNITED STATES PATENTS

| | | | |
|---|---|---|---|
| 3,689,891 | 9/1972 | Kril | 340/172.5 |
| 3,222,653 | 12/1965 | Rice | 340/172.5 |
| 3,643,243 | 2/1972 | Johnson | 340/174.1 B |
| 3,350,690 | 10/1967 | Rice | 340/172.5 |
| 3,422,402 | 1/1969 | Sakalay | 340/172.5 |
| 3,432,812 | 3/1969 | Elfant | 340/172.5 |
| 3,588,830 | 6/1971 | Duda | 340/172.5 |
| 3,434,116 | 3/1969 | Anacker | 340/172.5 |
| 3,633,175 | 1/1972 | Harper | 340/172.5 |

*Primary Examiner*—Garh D. Shaw
*Assistant Examiner*—Sydney R. Chirlin
*Attorney*—Robert L. Parker et al.

[57] ABSTRACT

An arrangement in which a disk pack consisting of a plurality of coaxial magnetic recording disks on which spare storage sectors are provided in one portion of each track on only one disk surface. A defect in any sector of any track on any disk surface which produces a recording error results in automatically relocating the sector information on one of the spare sectors without repositioning any of the magnetic heads. The defective sector is flagged and the sector address is transferred to one of the spare sectors. In doing a Read or Write operation, when addressing a particular sector in which an error condition is flagged, the system automatically switches to the spare sector.

10 Claims, 8 Drawing Figures

METHOD AND APPARATUS FOR PROVIDING ALTERNATE STORAGE AREAS ON A MAGNETIC DISK PACK

BACKGROUND OF THE INVENTION

Various types of bulk storage devices have been developed for digital processing systems, such as magnetic tape, disk files, and the like. One type of bulk storage device which has been developed in the disk pack in which information is stored on any number of coaxial disks and in which the pack of coaxial disks can be removed from the drive and replaced with anohter pack of disks, in much the same manner as magnetic tapes are replaced. The disk pack storage has the advantage that access time to a particular segment of data is much less than in the case of magnetic tape.

In the usual disk pack drive, each disk surface has associated therewith a magnetic head for recording or playing back digital data on the magnetic surface. These magnetic heads are mounted on a movable structure which permits all of the heads to be positioned simultaneously at any selected radial distance so as to be aligned with any one of a plurality of concentric tracks on each of the disk surfaces. All of the tracks at a given radial position of the heads are defined as being in a common cylinder. Therefore the radial position of the heads is referred to as the "cylinder" address position of the disk pack drive. Addressable data is arranged in sectors on each of the concentric tracks on each of the disk surfaces. A three dimensional address is provided to locate any given sector of data, the three dimensional address including the cylinder number, the number of the head corresponding to a particular recording surface, and the sector number corresponding to a particular angular position on the disk surface.

Typically a disk pack may have 10 disks, corresponding to 20 recording surfaces and therefore 20 magnetic heads, with 406 head positions, corresponding to 406 concentric cylinders, and with 33 sectors in each track. This gives a total of 267,300 separately addressable sectors.

Because errors either in the address information or the data stored in the sectors may develop or occur due to flaws in the recording surface or damage in handling the disk packs, it has been customary to reserve a portion of the addressable storage of the disk pack for recording data which could not be recorded in the primary area due to defects in the primary area. One prior art scheme for saving defective disk packs has been to reserve one or more tracks on each disk surface which can be used as alternate storage areas or spares when defects show up in the primary areas. However, in such an arrangement when a particular track develops an error, in order to substitute one of the spare tracks the entire disk pack must be reinitialized off line to establish the substitition of alternate tracks for the primary ones. Before initialization the data from the damaged pack must be transferred to another medium and then again recorded on the pack after initialization. Where errors are detected on a new disk pack during the initialization procedure, in the prior art arrangement, a single error on one track results in the use of one of the spare tracks, thus limiting the number of errors that can be accommodated per disk surface to the number of spare tracks set aside.

Another problem with prior art schemes has been that a portion of a bad track must be used to store the address of the alternate track to permit the system to locate the new location of the data. Thus every bad track requires that some recognizable information must be recorded on the bad track, giving rise to a reliability problem in this arrangement. Moreover, by switching from a bad track to a spare, the physical movement of the magnetic head from the defective track to the spare track is required. This movement of the head from the defective track to the spare track and back to a primary track for the next sequential sector introduces a substantial delay in the input/output operation. An alternative arrangement has been to relocate a complete cylinder to a spare cylinder. This of course still requires some additional head movement and is very wasteful of storage space.

SUMMARY OF THE INVENTION

The present invention is directed to an improved arrangement for relocating data on a magnetic disk pack when defective areas on the surface of the disk pack are encountered. Addressing of data in the disk pack is by cylinder number (which determines the position of the magnetic heads), head number (which determines which disk surface is selected), and sector number (which determines which angular segment of the rotating disks is selected). The disk pack is initialized by recording the address, including cylinder number, head number, and sector number, at the beginning of each sector. The address sequence is from sector to sector in each track, from track to track of one cylinder, and proceeding from cylinder to cylinder of all the primary tracks. Each cylinder is allocated a group of spare sectors, all of which are located on one disk surface, i.e., have the same head number in the address.

After initialization, the recorded addresses, as well as any test data recorded in each of the sectors, are verified by checking for address errors and for information parity errors. The file address or addresses of sectors in which errors are detected are then used to perform a relocate operation in which the address of any sector having an error is re-recorded in one of the spare sectors associated with the same cylinder and the defective sector is overwritten with a relocate flag. When reading or writing data on the disk pack, whenever a flagged defective sector is addressed, operation is momentarily switched to the head associated with the track in the same cylinder where the spare sectors are located. The spare sector is then located by the re-recorded address. Thus spare sectors are automatically substituted for defective sectors. No address information has to be recorded in the defective sector and no delay time is involved in moving magnetic heads from one track to another. A given file address will reach the spare sector automatically so that no modification of file addresses in the computer software results from substituting a spare sector.

BRIEF DESCRIPTION OF THE DRAWINGS

For a more complete understanding of the invention, reference should be made to the accompanying drawings, wherein.

DETAILED DESCRIPTION

Figure 1:
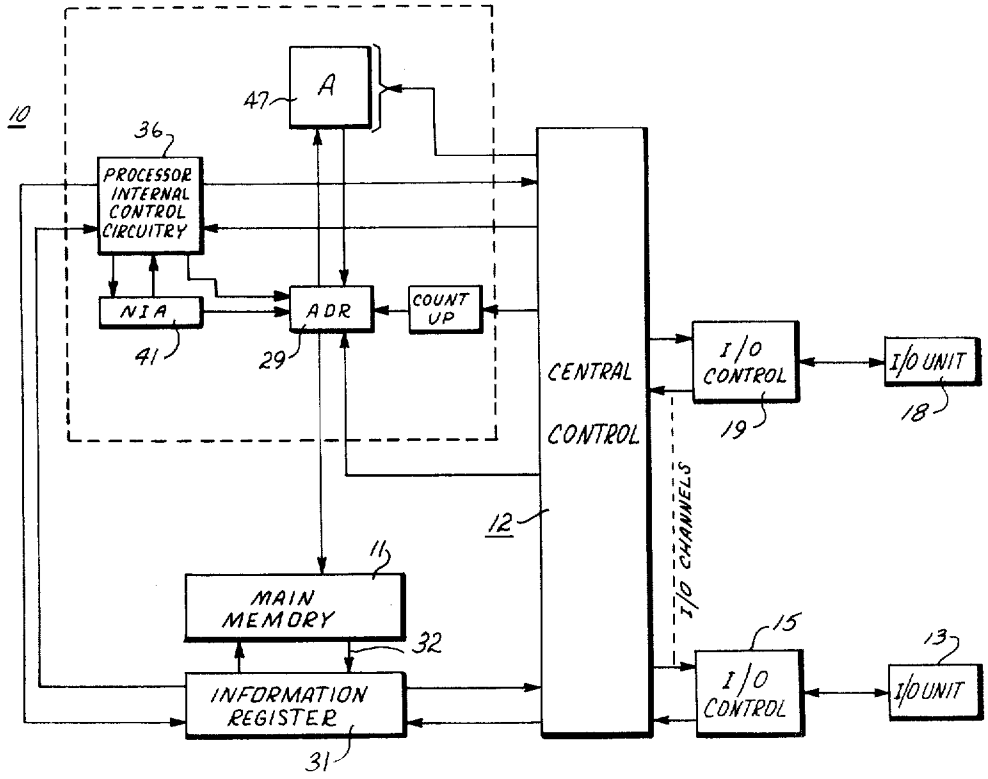
FIG. 1 is a block diagram of a computer system which incorporates the present invention.

Referring to FIG. 1, there is depicted a computer system of the type described in U.S. Pat. No. 3,514,758 and which corresponds to the Burroughs B3500 computer system. While the preferre embodiment herein described incorporates this specific computer system, it will be understood that the invention is in no way limited to use with a particular type of computer. As shown by FIG. 1, the computer system includes a central processing unit 10, a main memory 11, and a central control 12, which controls access to the main memory by the processor 10 as well as access by a plurality of input/output control units, two of which are indicated at 15 and 19. The I/O control units provide a control interface with an associated peripheral device, such as indicated at 13 and 18 respectively. At least one of the peripheral devices, in a system incorporating the invention, is a conventional disk pack memory, such as the disk pack drive manufactured and sold by Century Data Systems and described in more detail in connection with FIG. 2.

In operation, the processor 10 executes a series of program instructions stored in main memory 11. The processor 10 includes processor internal control circuitry 36 which utilizes a Next Instruction Address (NIA) register 41 to address and fetch the instructions sequentially from main memory 11 through an Address register 29. Each instruction includes an OP code portion and one or more addresses. The OP code portion of the instruction is transferred out of main memory through an Information register 31 to the processor internal control circuitry 36. while the address portions of the instructions are transferred by central control 12 to an address memory 47. In executing each instruction, the associated addresses stored in the address memory 47 are transferred to the Address register 29 to control the transfer of data between the main memory 11 and the processor 10.

Each I/O control, in response to an Initiate I/O instruction executed by the processor 10, receives a descriptor from main memory 11. The I/O control then executes the descriptor to perform the operation defined by the descriptor by way of controlling the associated peripheral unit. For example, a descriptor may cause the I/O control to transfer data out of a specified area of main memory to the peripheral device, or may cause data to be read out of the peripheral device into a specified area of main memory 11. All transfers of data between main memory and any of the peripheral devices or the processor is done on a time-shared basis by the central control unit 12, which handles all requests for memory access on a predetermined priority basis. Whenever a particular I/O control unit completes the execution of an I/O descriptor, it stores a Result descriptor in a predetermined location in main memory where it is available to the processor 10 when executing the Master Control Program by which all input/output operations and other internal control operations are carried out. The description thus far describes a typical digital computer system, such as set forth in more detail in the above-identified patent, and is by way of background to understanding the operation of the present invention.

Figures 2, 3, 4:
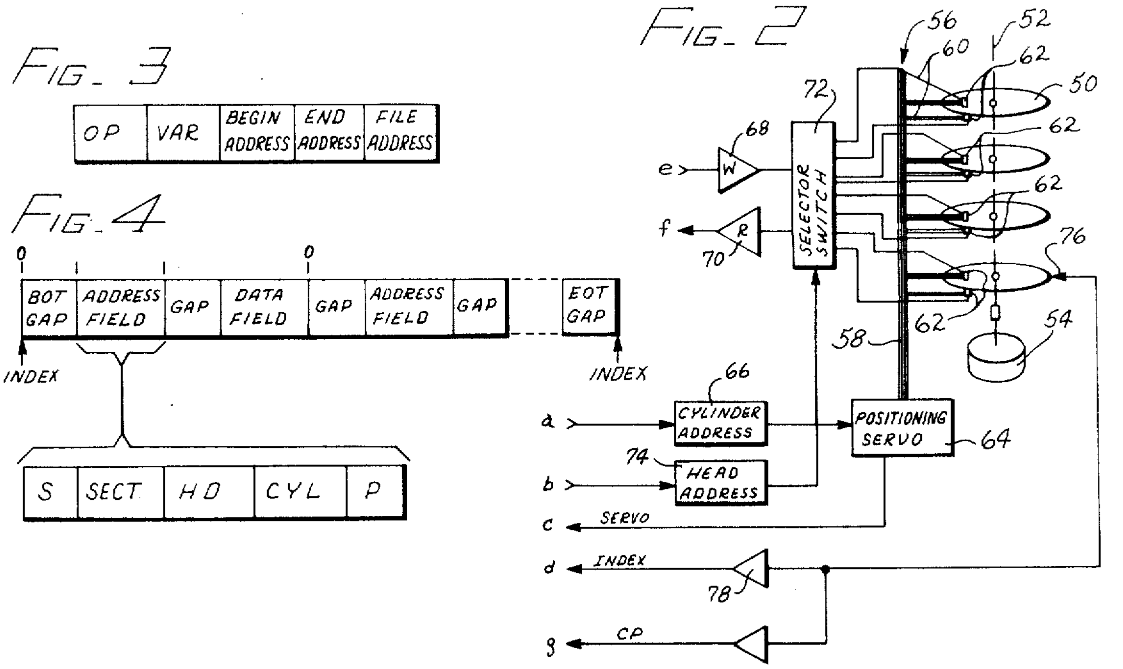
FIG. 2 is a schematic diagram of the disk pack drive peripheral device.
FIG. 3 illustrates the format of a disk pack I/O descriptor.
FIG. 4 shows the format of a track on one of the disks.

Referring to FIG. 2 there is shown in schematic form, a conventional disk pack drive. The disk pack drive includes a plurality of disks 50 mounted on a common shaft 52. The drive is preferably arranged so that the assembly of disks may be removed from the drive and replaced by other disk pack assemblies. When in position, the shaft 52 is rotated by a drive motor 54 which simultaneously rotates all of the disks relative to a magnetic head assembly, indicated generally at 56. The magnetic head assembly is typically in the form of a rotatable shaft 58 from which project a plurality of radial arms 60, at the ends of which are mounted magnetic heads 62 that are arranged to engage the respective surfaces of the magnetic disks for the purpose of recording on or playing back digital information magnetically on the surface of the disks. Thus the assembly 56, referred to as the "head comb," provides an arrangement by which all of the magnetic heads can be simultaneously positioned at various radial distances from the center of the disks. A positioning servo 64 provides a means of indexing the shaft 58 to selectively position the magnetic heads opposite any one of a plurality of concentric tracks on the respective surfaces of the disks 50.

As described above, the radial position of the heads is specified by a cylinder number address, the corresponding track on each of the disks being considered as lying in a common cylinder. The positioning servo 64 responds to digital information stored in a Cylinder Address register 66. By way of example, the cylinder address may specify any one of 406 cylinders, numbered 0 through 405. When the positioning servo has located the head comb at the specified cylinder identified by the Cylinder Address register 66, it provides an output signal on a line designated SERVO.

Each of the magnetic heads 62 is selectively coupled to the output of a Write amplifier 68 and the input to a Read amplifier 70 thorugh a selector switch 72. The selector switch 72 is controlled by the head number address stored in the Head Address register 74. By way of example, there are typically 10 disks providing 20 disk surfaces, corresponding to 20 magnetic heads numbered 0 through 19. Also for control purposes a magnetic head 76 may be provided on one of the disks for sensing an index bit once each revolution of the disk. The output of the magnetic head 76 is applied to an output control line, labeled INDEX, through an amplifier 78. A separate clock track may also be provided on one disk for reproducing clock pulses on a line designated CP. However, it will be appreciated that self-clocking codes could be used for recording in the data tracks, avoiding the need for a clock track.

In order to control the disk pack drive, the associated I/O control is designed to respond to any one of five descriptors. The format of these five descriptors is shown in FIG. 3. The first portion of the descriptor includes an operation code, referred to as the OP code of the descriptor. The OP code designates one of five operations, namely, Write, Read, Initialize, Verify, and Relocate. The descriptor further includes a group of variant digits which may be used to provide operational information such as the type of format, the designation of a particular drive unit where the I/O control is arranged to control a group of drive units through an exchange, for example, and other control functions that will be described below. These descriptors further include a Begin address of a field in main memory to be used during the execution of the descriptor followed by an End address of the field in memory. Finally a file address in included in the descriptor whcih points to a particular sector in the disk pack file. The file address format uses consecutive numbers to designate all the prime sectors beginning at sector 0, which is the first sector after the index position on the disk surface, head 0 and cylinder 0, and continuing by sector, head, and cylinder in that order. The spare sectors which are set aside for each cylinder and are associated with head 0 are not addressed in this address continuum. There are, by way of example only, five contiguous spare sectors for each cylinder, the spare sectors being set aside on the disk surface associated with head 0. Thus of the 33 sectors associated with head 0 in each cylinder, 28 are primary sectors and 5 are spare sectors. For example, file address 27 points to sector 27, head 0, and cylinder 0. File address 28 points, not to sector 28 which is a spare sector, but to sector 0, head 1, cylinder 0.

Before a disk pack can be utilized to store data, it must first be initialized. This is accomplished by executing the Initialize descriptor. In response to the OP code of the Initialize descriptor when received from memory, the I/O control unit writes sector addresses and test data in all tracks starting at the sector decoded from the file address in the descriptor. All sectors, starting with the sector position identified by the file address, are initialized, including the spare sectors. FIG. 4 shows the format of each track after initialization. Following the Index position, there is a Beginning Of Track gap followed by the address of the first sector in the track. This is followed by another gap, the data field, another gap, and then the address for the second sector on the track. The End Of Track gap completes the track, representing one revolution of the disk pack. The format of the address portion of each sector includes a spare flag bit, designated S, which indicates whether the sector is a primary (S=0) or spare (S=1) sector. This is followed by the sector number, the head number, the cylinder number, and finally a parity bit P.

Figure 5:
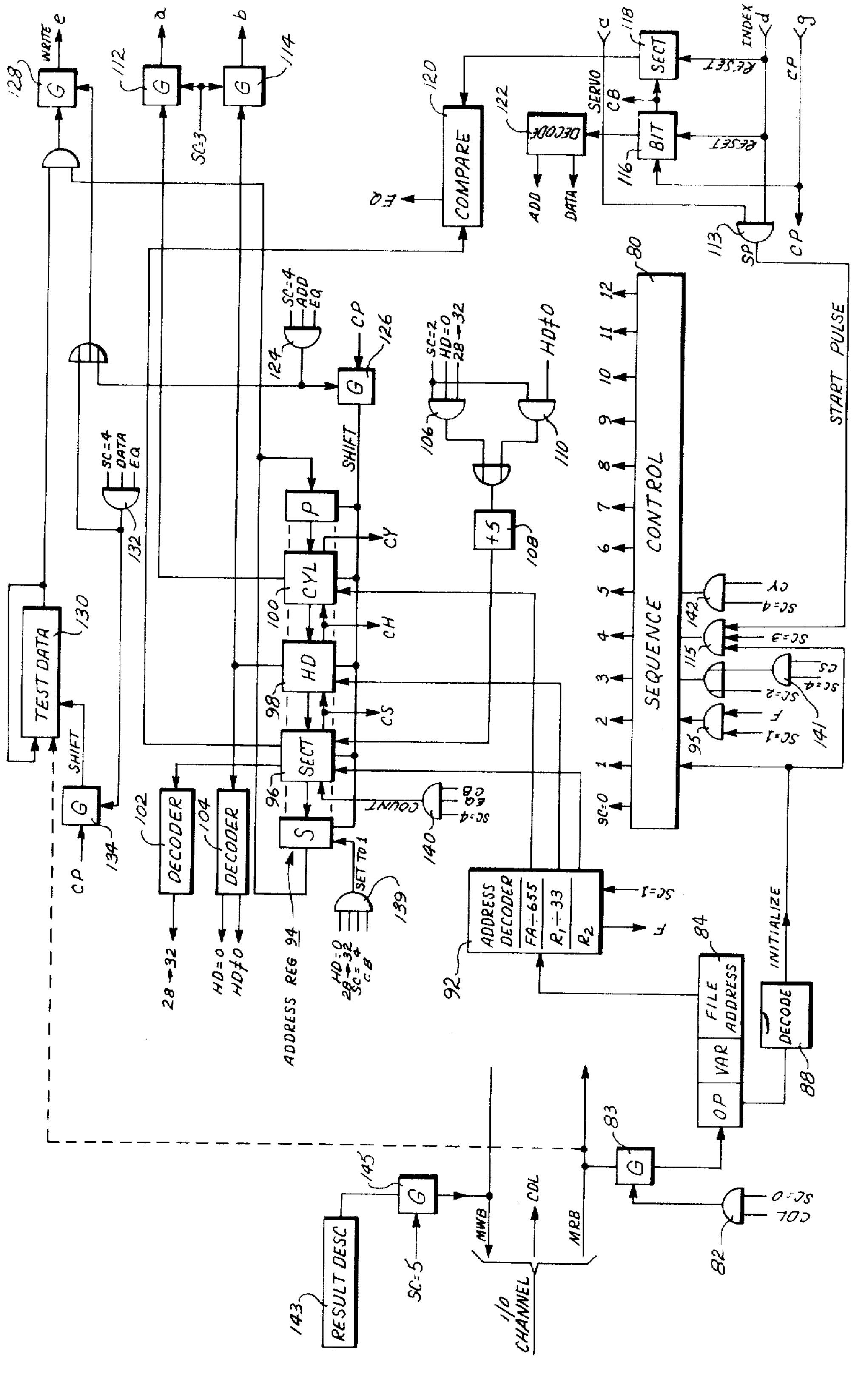
FIG. 5 is a block diagram of the disk pack control unit showing the control logic for executing the Initialize descriptor.

The operation of the disk pack control unit, in combination with the computer system and the disk pack drive, when executing the Initialize descriptor is described in detail below in connection with FIG. 5. As set forth in detail in the above-identified patent, when an Initiate I/O instruction is executed by the processor 10, the processor stores the address of an I/O descriptor, in this case the disk pack Initialize descriptor, in the address memory 47 and at the same time signals the disk pack control over the appropriate channel from the central control 12 that an operation is to be initiated by the control. A control line in each channel from the central control 12, designated the Channel Designate line (CDL), is received by the particular control unit and specified by the Initiate I/O instruction and is used to activate the control unit. The control unit then transfers the addressed descriptor from main memory to the control unit, using the address in the address memory 47, the Begin and End address portion of the descriptor being transferred to locations in the address memory 47 assigned to the particular channel.

The control unit includes a sequence control 80 which is advanced through a plurality of states, starting with SC=0, for controlling the sequence of operations in the control unit. With the control unit initially in the SC=0 state, an AND circuit 82 senses when the Channel Designate line has come on to initiate an I/O operation. The output of the AND circuit 82 opens a gate 83 coupling the Memoryy Read bus (MRB) to a Control register 84. Assuming the descriptor is an Initialize descriptor, the OP code, variant, and file address portions of the descriptor read out of memory and placed on the Memory Read bus to the control unit are gated into the Control register 84. At the same time, the Begin and End addresses are placed in a location in the Address memory 47 allocated to the particular I/O channel, all as more specifically described in the above-identified patent.

The OP code in the register 84 is applied to a decoder 88 which, in response to the Initialize OP code, provides a signal on the output line labeled INITIALIZE. The INITIALIZE condition sets the sequence control to the SC=1 state.

During the SC=1 state, the file address in the register 84 is decoded by an address decoder 92 and stored in Address register 94 as the corresponding cylinder, head, and sector numbers. The decoder is an arithmetic circuit which is activated during the SC=1 state. The arithmetic decoder generates a cylinder number by dividing the file address by the number of primary sectors in a cylinder. In the embodiment described in which there are 20 heads each with 33 sectors, the number of primary sectors is 655 (20 × 33 less 5 spares). The remainder from this division is then divided by the number of sectors per track, namely, 33, giving the head number. The remainder of this division gives the sector number. Once the arithmetic address decoder has completed the operation it puts out a signal, designated F, indicating that the operation is complete. The F signal is applied to an AND circuit 95 together with the SC=1 state, the output advancing the sequence control to the SC=2 state.

During the SC=2 state, the address in the Address register 94 must be corrected to skip the five spare sectors on the track scanned by head 0 since the file address applies only to the primary sectors. The register 94 is arranged with three sections which operate as counters. The first section 96, which stores the sector number, may be counted up to a maximum count by pulses applied to the count input line 32. The section 96 then is reset to 0, producing a carry pulse CS which is applied to the next counter section 98 storing the head number. Section 98 can be counted up through a maximum count of 19 and then resets to 0, producing a carry CH which is applied to the next counter section 100 storing the cylinder number. The cylinder number section can be counted from 0 up to 405, corresponding to the total number of cylinders in the system and then resets to zero, producing a Carry pulse CY. The Address register 94 also stores a spare flag bit section S, and a parity bit section P.

To set aside the last five sectors 28 through 32 at head 0 on each track as the spare sectors, it is necessary to increment the sector count by 5 whenever the decoded file address provides a head number that is not 0, or whenever the head number is 0 and the sector number is 28 through 32, corresponding to the five spare sectors. To this end, the sector number is applied to a decoder 102 which provides an output signal when the sector count is 28 thorugh 32. The head number in the head count section 98 is also applied to a decoder 104 which provides output signals indicating whether the head number is 0 or not 0. An AND circuit 106 during the SC=2 state senses that the head number is 0 and that the sector number is any number 28 through 32. The output of the AND circuit 106 is applied to an add-5 circuit 108 which advances to the sector counter by a count of 5. Since adding 5 advances the sector counter beyond 32, it is reset to a value 0 through 4 and at the same time a carry CS is generated which advances the head count section 98 by 1. An AND circuit 110 during the SC=2 state senses if the head number is not 0, the output of the AND circuit 110 also being applied to the add-5 circuit 108 to adjust the sector count by 5. In this manner the five spare sectors in each cylinder are automatically set aside and cannot be addressed by the file number. The sequence control is then advanced to the SC=3 state.

During the SC=3 state, the cylinder number and the head number are transferred respectively by gates 112 and 114 to the Cylinder Address register 66 and Head Address register 74 in the disk pack drive. As a result, the positioning servo 64 and the selector switch 72 are actuated to respectively position the heads in the proper cylinder and to select the particular head to be connected to the Write amplifier 68 and Read amplifier 70. When the positioning servo 64 has properly positioned the head, it provides a signal on the line labeled SERVO. The SERVO line and the INDEX line are applied through an AND circuit 113 to an AND circuit 115 together with the INITIALIZE signal to set the sequence control to SC=4.

During the SC=4 state, the sector, head, and cylinder number address for each sector on the disk pack is recorded in a predetermined portion, called the address field, of the sectors. See FIG. 4. The balance of each sector, called the data field, has test data recorded in it. Initializing starts with the sector identified by the contents of the Address register 94. A counter having a bit counter section 116 and a sector counter section 118 is counted up by clock pulses CP derived from the clock track on the disk pack. The bit section 116 and sector section 118 are reset to 0 by the Index pulse. The bit counter section provides a carry pulse CB which is applied to the sector section 118 when the bit counter section has reached its maximum count condition corresponding to the predetermined number of bits recorded in one sector.

The sector section 118 is compared with the sector number in section 96 of the Address register 94 by means of a compare circuit 120 which provides output signal EQ indicating when the sector numbers are equal. The count condition of the bit section 116 is applied to a decoder 122 which has two output lines designated ADD and DATA. The decoder applies a signal to the ADD line when the bit count is within the limits of the address field of a sector. The DATA line is activated by the decoder 122 when the bit count is within the limits of the data field of a sector.

An AND circuit 124 during the SC=4 state senses when the bit counter 116 is within the address field and when the compare circuit 120 indicates that the sector counter has reached the sector number stored in the sector register section 96. The output of the AND circuit 124 is applied to a gate 126 which allows clock pulses to shift out the contents of the register 94. This output is applied to a gate 128 to the Write amplifier 68 in the disk pack drive for recording the address on the disk. When the bit counter 116 reaches the count corresponding to the data field of the sector, test data is shifted out of a Test Data register 130 to the gate 128 to be recorded in the disk. An AND circuit 132 senses when the sector numbers compare (EQ) and when the bit counter section 116 corresponds to the data portion of the sector (DATA). The output of the AND circuit 132 operates a gate 134 for applying clock pulses to shift out the test data serially from the Test Data register 130. The test data may be either a preset test word which is repeatedly recorded in the date section of the sector, or may be test data derived from main memory over the Memory Read Bus from the buffer section in memory defined by the Begin and End addresses of the Initialize descriptor. The gate 128 is controlled by the AND circuits 124 and 132 so that the gate 128 is open when either the Test Data register 130 or the Address register 94 is being shifted.

The carry pulse CB from the bit section of the register 116 in addition to advancing the sector counter 118 is also used to advance the address in the register 94. To this end, an AND circuit 140 senses the SC=4 state and the sector equal condition from the compare circuit 120 and the carry pulse CB from the bit counter 116. The output of the AND circuit 140 is used to count the sector section 96 of the address register 94 to advance the address by one. When the sector section 96 produces a carry CS, the sequence control 80 is reset to SC=3 by the output of an AND circuit 141. This causes the new head number to be gated to the disk pack drive by gate 114. Whenever the section number is 28 → 32, as indicated by the decoder 102, and the head number is zero, an AND circuit 139 sets the spare flag bit S to one in response to the CB pulse. Thus the spare sectors have the addresses recorded with the spare flag bit set to one, whereas the spare flag bit is set to zero for all prime sectors.

When the address has been counted through all of the cylinders, cylinder section 100 when reset to 0 puts out a carry signal CY which is applied to an AND circuit 142 together with the SC=4 state. The output of the AND circuit 142 advances the sequence control to the SC=5 state. During this state, a result descriptor is returned to a predetermined location in memory from a Result Descriptor register 143 by a gate 145, indicating to the system that the I/O control unit has completed the operation called for by the descriptor. The generation and storage of result descriptors is conventional practice and is described in the above-identified patent.

After the Initialize operation, the Master Control Program, after examining the result descriptor, initiates another I/O operation on the same I/O channel causing another descriptor to be issued to the control unit and stored in the register 84. Under normal circumstances, this would be the Verify descriptor which functions to verify that the system has correctly recorded the addresses and test data on the disk pack during the Initialize operation. The verification can start with any file address specified by the descriptor.

Figure 6:
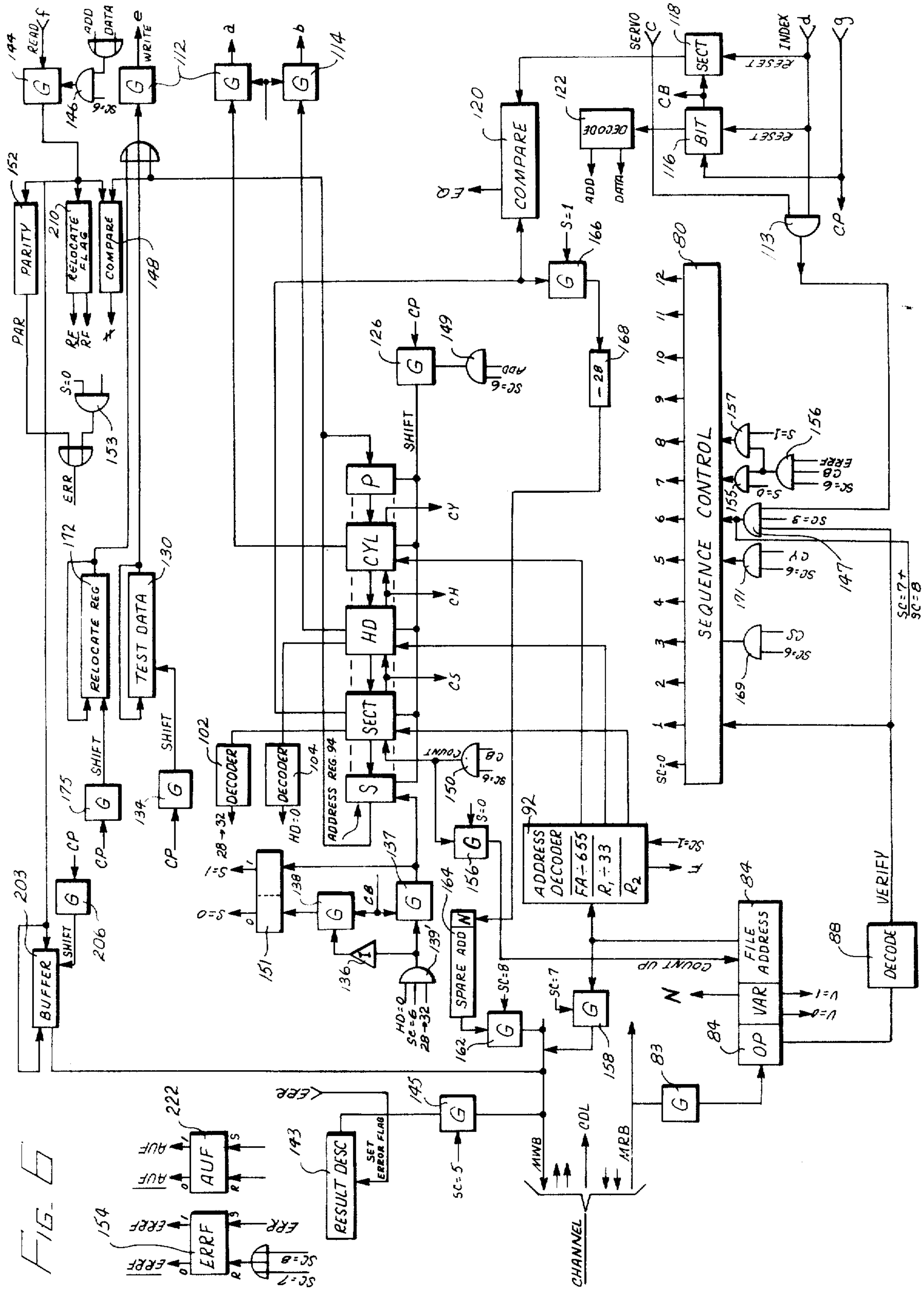
FIG. 6 is a block diagram of the disk pack control unit showing the control logic for executing the Verify descriptor.

Referring to FIG. 6, the operation of the control unit in response to the Verify OP code is shown in more detail. Assuming the decoder circuit 88 indicates a Verify OP code, the sequence counter advances through states SC=1, SC=2, and SC=3 in the same manner as described above in connection with FIG. 5. During these states, the file address is decoded and placed in the Address register 94 and the head and cylinder addresses are transferred to the disk pack drive. When the head positioning servo has positioned the heads at the correct cylinder, an AND circuit 147 sets the sequence counter to the SC=6 state.

During the SC=6 state, addresses and data are read off the disk pack through a gate 144 which is controlled by the output of an AND circuit 146. The AND circuit 146 senses the SC=6 state, and that the bit count of the counter 116 corresponds to the address field or the data field of a sector, as indicated by the output of the circuit 122. The output of the gate 144 is applied serially bit-by-bit to one input of a compare circuit 148. The other input is derived from the Address register 94 by applying shift pulses through the gate 126. The gate 126 is controlled by the output of an AND circuit 149 which senses the SC=6 state and the address field ADD.

The output of the gate 144 is also applied to a parity check circuit 152 which checks for correct parity on each address as well as the test data as read off the disk pack. This operation continues on successive sectors by incrementing the address in the Address register 94 in response to the carry pulse from the bit counter 116. Incrementing is provided by the output of an AND circuit 150 which senses the SC=6 state and the carry pulse CB generated by the output of the bit counter 116. The output of the AND circuit 150 is also used to count up the file address in the register 84 except for spares. So that the file address is not incremented for spare sectors, the file address is incremented by the output of an AND circuit 156 when the spare flag bit is 0 (S=0). The spare flag is set to 1 by the CB pulse applied to a gate 137 controlled by the output of an AND circuit 139' whenever the head number is 0 and the sector number is 28 through 32, corresponding to the five spare sectors for each cylinder. A control flip-flop 151 is also set to 1, so that the S=1 is true even during the shifting of the register 94. The flip-flop is reset by a CB pulse through a gate 138 controlled by the output of the AND circuit 139 through an inverter 136.

If during the address comparison or the parity check, an error is detected, an ERRF control flip-flop 154 is set to 1 by the output of the compare or parity circuits. Errors on address comparison in the spare sectors have no meaning as the addresses in the spare sectors may be the same as the addresses of the corresponding relocated prime sectors. Therefore the output of the compare circuit 148 is applied to an AND circuit 153 together with the flag bit S=0. The sequence control counter is then set to SC=7 or SC=8 by the output of an AND circuit 156 at the end of the sector, as indicated by the carry CB from the bit counter 116. The sequence counter is set to SC=7 if the spare flag bit is off (S=0) or set to SC=8 if the spare flag bit is on (S=1) by AND circuits 155 and 157.

During the SC=7 state, the file address in the Descriptor register 84 is gated on to the Memory Write Bus by a gate 158 and is written into the buffer field of main memory defined by the BEGIN address specified by the descriptor, in conventional manner. Also the ERRF flip-flop 154 is reset to 0 and the sequence counter returns to the SC=6 state.

If the error is encountered in verifying a spare sector, the sequence counter is set to the SC=8 state. During SC=8, a spare address is gated on to the Memory Write Bus by a gate 162 from a Spare Address register 164. The spare address includes a flag indicating that it is a spare address, includes a cylinder number as derived from the Address register 94, and the number N of the spare sector. N is derived from the sector address number in the Address register 94 by subtracting 28 from the sector number whenever the spare flag is on, as indicated by S=1. To this end a gate 166 connects the output of the sector number in the Address register 94 through a "subtract-28" circuit 168 to the Spare Address register 164 in response to the S=1 condition.

At the completion of the SC=7 or SC=8 states, the ERRF flip-flop 154 is reset to 0 and the sequence counter is returned to the SC=6 state. Verification continues through the remainder of the disk pack. Whenever the head address is changed, the sequence counter is reset to SC=3 by an AND circuit 169 that senses SC=6 and the carry pulse CS. A carry pulse CY is derived from the cylinder section of the register 94, resetting the sequence control counter to the SC=5 state by the output of an AND circuit 171. As described above, during SC=5 a Result descriptor is stored in main memory and the sequence control 80 is returned to SC=0. An error condition ERR from the compare or the parity error circuits 148 and 152 is used to set a flag bit in the Result descriptor which indicates a verify error to the system when the Master Control Program examines the Result descriptors in memory.

On finding a Result descriptor having a verify error flag set, the Master Control Program is arranged to generate a Relocate descriptor in memory which includes the file address of the sector having the error flag. The software for generating a descriptor and storing it in a predetermined location in memory is conventional and common to the execution routines used by the B3500 Burroughs computer and other computer systems having input/output controls that operate independently of a central processor. The Master Control Program then executes an Initiate I/O instruction pointing to a Relocate descriptor. The Relocate descriptor is transferred to the disk pack control unit, in the same manner as described above in connection with the Initialize descriptor and the Verify descriptor. The file address of the Relocate descriptor points to a sector in which an error was found during the Verify operation. In addition the variant field of the Relocate descriptor specifies one of the five spare sectors by a digit N, corresponding to N=0 through N=4. The operation of the control unit in executing the Relocate descriptor is shown in detail in FIG. 7.

The decode circuit 88 in response to the OP code of the Relocate descriptor activates a Relocate line. The sequence control 80 advances to the SC=1, SC=2, and SC=3 states in the same manner as described above in connection with FIGS. 5 and 6. Thus the file address is decoded and stored in the Address register in the form of a sector number, head number, and clyinder number pointing to the sector which contains an error and which is to be relocated in the specified spare sector N of the same cylinder.

Figure 7:
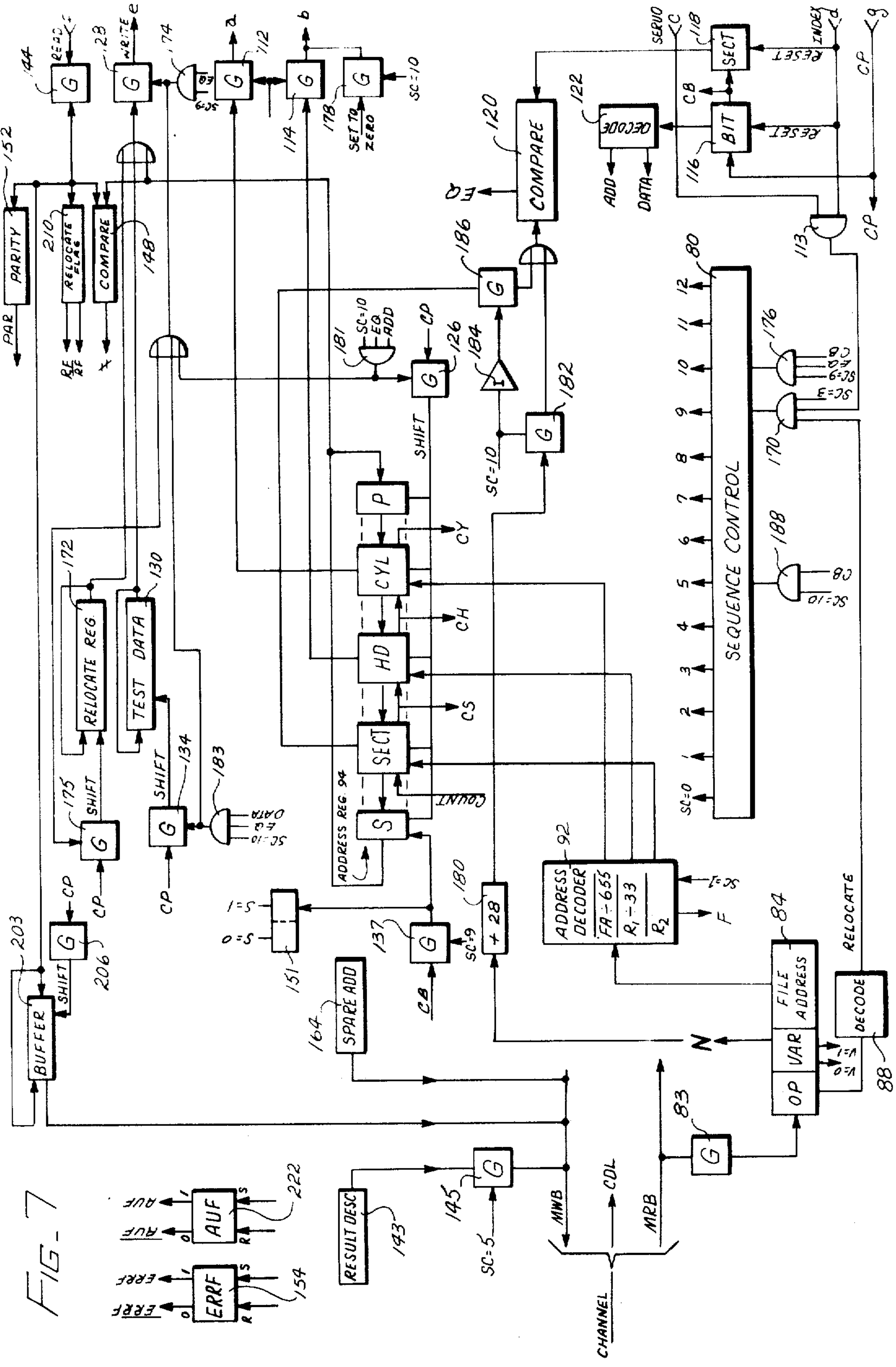
FIG. 7 is a block diagram of the disk pack control unit showing the control logic for executing the Relocate descriptor.

Referring to FIG. 7, after the cylinder and head addresses have been transferred to the disk pack drive from the Address register 94 during the SC=3 state, in the same manner described above in connection with the Initialize and verify descriptors, the sequence counter is set to the SC=9 state by the output of an AND circuit 170. The AND circuit 170 senses that the sequence counter is in the SC=3 state, that the Relocate OP code is present, and that the head positioning servo has positioned the heads at the correct cylinder position.

During the SC=9 state a special Relocate flag pattern is laid down in the address field of the sector designated by the file address of the Relocate descriptor. Any suitable code can be used for the Relocate flag, which when laid down throughout the address field, can be readily recognized as such when read out from the sector being relocated. The relocate flag pattern is stored in a register 172 and shifted to the Write line at the disk pack drive by shifting out the flag pattern using clock pulses CP through a gate 175. The gate 175 and gate 128 are controlled by an AND circuit 174 that senses SC-9 and EQ conditions are true. At the same time the spare flag is turned on in the Address register 94 and the control flip-flop 151 is set to 1. When the carry bit CB is generated by the bit counter 116 at the end of the sector, the sequence counter is then advanced to the SC=10 state by the output of an AND circuit 176, which senses that the sequence counter is at SC=9. that the sector compare is equal (EQ), and that the carry bit CB is present from the bit counter 116.

With the sequence control in the SC=10 state, the head address in the register 74 of the disk pack drive is set to 0 by the output of a gate 178. The spare sector N designated by the variant bits in the Descriptor register 84, which is a number 0 through 4 corresponding to one of the five spares, is applied to a "+28" circuit 180 to generate the actual sector number (N+28) of the designated spare sector. This spare sector number is applied through a gate 182 to the compare circuit 120 during the SC=10 state in place of the sector number in the Address register 94. To this end, the SC=10 state is applied through an inverter 184 to a gate 186 through which the sector address is normally applied to the compare circuit 120, thus closing the gate 186 while opening the gate 182. When the spare sector number corresponds to the sector count of the counter 118, the address in the register 94 is read into the address field of the spare sector. Clock pulses are applied through gate 126 to shift the contents of the Address register 94 out through gate 128 to the line going to the Write amplifier in the disk pack. The gates 126 and 128 are gated on by the output of an AND circuit 181 which senses that the bit counter 116 is in the address field, and that the sector equal condition is present from the compare circuit 120. This is followed by writing the test pattern from the register 130 into the data field of the spare section by applying clock pulses to the shift input to the register 130 through the gate 134 in response to the output of an AND circuit 183. Thus at the end of the SC=10 state, the designated spare sector has now received the address of the relocated sector but with the spare flag set to 1.

The sequence control is then reset to the SC=5 state by the output of an AND circuit 188 during which a Result descriptor is returned to memory and execution of the Relocate descriptor is terminated.

Figure 8:
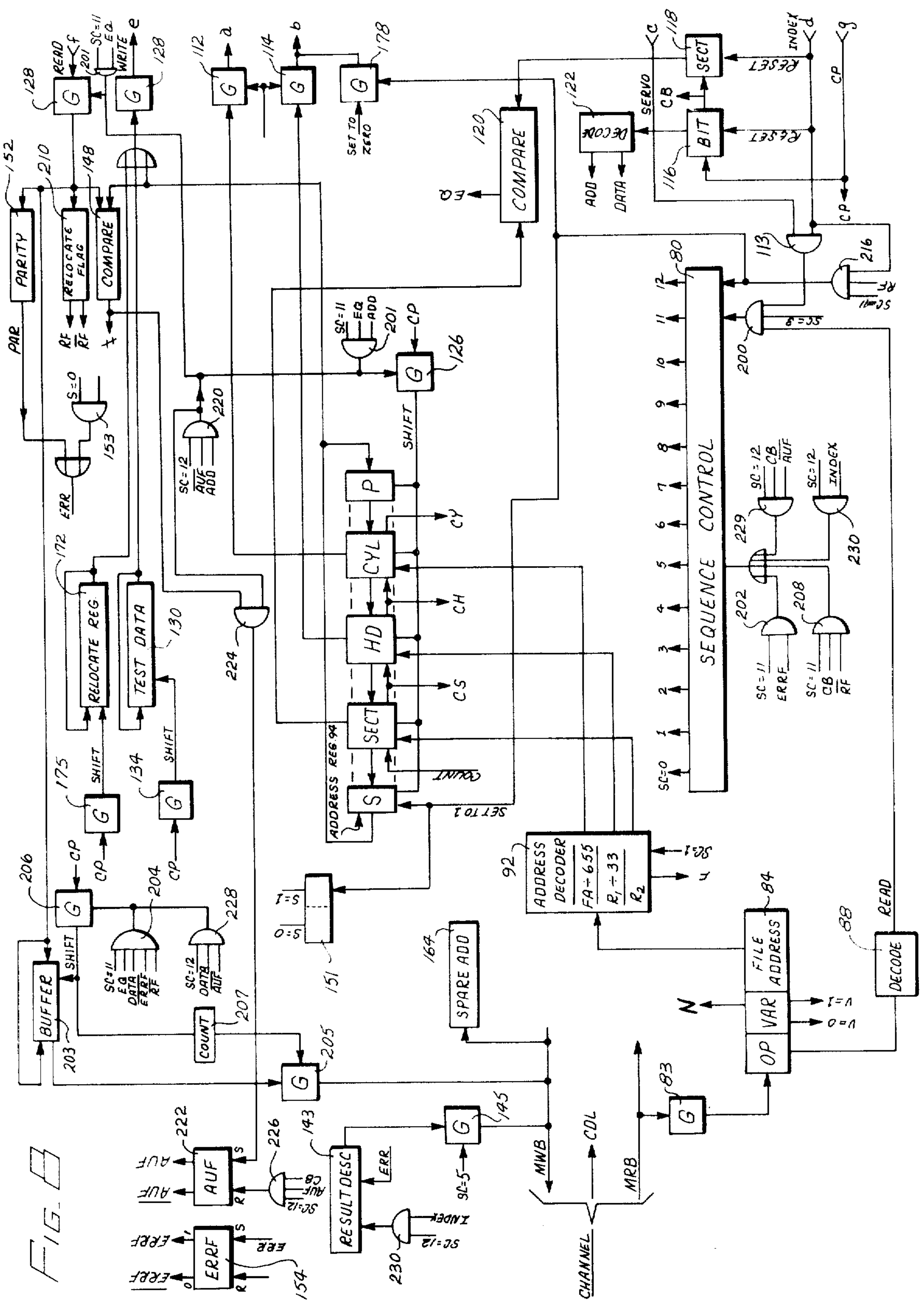
FIG. 8 is a block diagram of the disk pack control unit showing the control logic for executing the Read descriptor.

In subsequent execution of a Read or Write descriptor for transferring data between the disk pack and main memory, the disk pack controller provides for automatic transfer from a sector containing a relocate flag to the spare sector which was assigned during execution of the Relocate descriptor. The manner in which the controller accomplishes this function is shown in FIG. 8 for the Read descriptor.

Once a Read operation is initiated by transferring a Read descriptor to the Descriptor register 84 in the control unit during SC=0, the file address is decoded during SC=1 and placed in the Address register 94 in the manner described above. The head number and cylinder number are then transferred to the disk pack during SC=3 to position the heads and to select the designated head. The sequence control is then set to the SC=11 state by the output of an AND circuit 200 which senses that the OP code in a Read, the sequence control is in the SC=3 state, and the head positioning servo has correctly positioned the heads.

During the SC=11 state, the sector number in the register 94 is compared with the sector number in the counter 118. When the compare circuit 120 indicates they are equal, the gates 126 and 128 are opened by the output of an AND circuit 201, causing transfer of information read off the disk to be applied to one input of the compare circuit 148. At the same time, the address in the Address register 94 is shifted out serialy to the other input of the compare circuit 148 by clock pulses applied to the shift input of the register 94 thorugh the gate 126. If the addresses don't compare of if there is a parity bit error, the ERRF flip-flop 154 is set to 1 in the same manner as described in connection with FIG. 6 and a flag is set in the Result Descriptor register 143. The sequence counter is set to SC=5 by the output of an AND circuit 202, causing the Result descriptor to be stored in memory. If there is a valid comparison and no parity bit error, the ERRF flip-flop 154 remains set at 0 and the data in the sector is then read out and assembled in bytes or words in a buffer register 203, each byte or word assembled in the buffer register 203 then being transferred to the main memory over the Memory Write Bus starting at the beginning address specified by the descriptor. The buffer register is connected to the Memory Write Bus by a gate 205 in response to a counter 207 during SC=11. The counter, in response to shift pulses, indicates when a complete byte or word has been shifted into the buffer 203. The transfer of data from the disk to memory is a conventional control function which forms no part of the present invention.

An AND circuit 204, in response to the SC=11 state, the sector equal condition EQ from the compare circuit 120, the data condition from the decode circuit 122, the non-error condition ($\overline{\text{ERRF}}$) from the control flip-flop 154, and the absense of a relocate flag ($\overline{\text{RF}}$) causes clock pulses to be gated by gate 206 to shift the buffer 203. The shift pulses shift in the bits received serially from the disk during the readout of the data.

After the data in the sector has been transferred to memory, the carry pulse CB from the bit counter 116 applied through an AND circuit 208 is used to reset the sequence control to the SC=5 state in which the Result descriptor is transferred to memory and the operation is then terminated. It will be noted that if an error in comparing the address or an error in the parity check occurred, turning on the ERRF flip-flop 154, the error flag, in the Result descriptor is set in the same manner as described above in connection with the Verify descriptor in FIG. 6.

During the reading out of the address from the disk pack, the address is also gated into a relocate flag detector circuit 210. If the sector address contains a relocate flag as a result of a prior execution of the Relocate descriptor, an output signal Rf is generated by the relocate flag detector. The RF level is applied to an AND circuit 216 together with the SC=11 state and the Index pulse. The output of the AND circuit 216 sets the sequence control 80 to the SC=12 state. It also turns on the spare flag in the address register 94. It also opens the gate 178, permitting the Head Address register 74 in the disk pack drive to be set to 0, thus selecting head No. 0.

During the SC=12 state, the address fields of all sectors read out by head No. 0 are compared with the address in the Address register 94. When a comparison is achieved, the data is then transferred from that spare sector to main memory. To accomplish this, the address in the Address register 94 is shifted into one input of the compare circuit 148. At the same time the sector address is read from the disk to the other input of the compare circuit 148 during each field. This is accomplished by an AND circuit 220 which senses the SC=12 state, the presence of the address field, and that a control flip-flop 222, designated AUF, is set to 0. As a bit-by-bit comparison is made between the address in the register 94 and the address being read off the disk, if any bits compared are not equal, the AUF flip-flop is set to 1 by the output of an AND circuit 224. The AUF control flip-flop 222 is reset to 0 by the output of an AND circuit 226 in response to the carry CB from the bit counter 116. If a comparison exists, the AUF control flip-flop 222 will not be set to 1. As a result during the data field portion of the sector, the data is read from the disk into the buffer 203 in response to the utput of an AND circuit 228 which opens the gate 206 to apply clock pulses to the shift input of the buffer 203. In this way data is transferred from the data portion of the spare sector into main memory. When the transfer of data is complete, the sequence control is set to SC=5 by the output of an AND circuit 229 which senses the SC=12 state, the bit counter Carry CB, and the AUF control flip-flop 222 is set to 0. During SC=5 the Result Descriptor is transferred to the main memory and the operation is terminated.

If no comparison is achieved, if the sequence control is still in the SC=12 state when the Index pulse is again received from the disk pack drive, the sequence control is set to the SC=5 state by the output of an AND circuit 230 which also sets a flag bit in the Result Descriptor register to indicate that no comparison was acheived on any sector address during one complete revolution of the disk pack.

From the above description it will be seen that the Initialized descriptor, the Verify descriptor, and the Relocate descriptor provide the programmer with the tools to design a Master Control Program that is capable of utilizing spare sectors for relocating data when the primary sectors are found to be defective. By providing a group of spares for each cylinder located under head No. 0, a sector anywhere in the cylinder can be relocated in one of the spare sectors without moving the heads radially to other tracks. Thus the only time lost in locating data which has been relocated on a spare is the time required to make at least one and at the most two revolutions of the disk pack drive.

What is claimed is:

1. In a disk pack file in which information is recorded on a plurality of coaxially rotating disks in concentric tracks, the method of adjusting the file to compensate for defective recording areas on any of the disks, comprising the steps of: recording address information in each of a predetermined number of sectors of each track on each of the disks, recording test data following the address in each of the sectors of the disk pack, reading out and checking the address and test data from each sector to detect an error condition, recording a repetitive pattern of bits as an error flag in any sector in which an error condition is detected, and recording the same address information previously recorded in the sector in which the error flag is recorded in one of predetermined group of spare sectors.

2. The method of claim 1, further comprising the steps of: providing a corresponding group of sectors in each track on one of the disks as spare sectors, and recording a flag in each of the spare sectors indicating the sector is a spare sector.

3. The method of claim 2 wherein: in recording the address of a sector in which an error has been detected in a spare sector, a spare sector is selected in the track having the same diameter as the track of the sector having the error.

4. In a magnetic storage system in which digital data is recorded on a plurality of rotating magnetic disks rotated about a common axis and having a magnetic head associated with each disk surface, the heads being movable as a unit radially of the disks to a plurality of radially indexed track position, the method of compensating for flaws on any of the disks comprising the steps of: recording in sequence address information at equally spaced sector intervals on each of the tracks associated with each radial position on the heads; recording a flag with the address in a group of sectors on one disk surface for each radial position of the heads, the flag identifying ghe associated sector as a spare, recording data in each of the sectors, reading out the address and data from each of the sectors in sequence, testing for errors in the recorded address information and data of each of the sectors, relocating the address information associated with any sector having an error to one of the spare sectors, and recording a flag in the sector having error indicating that the address is relocated in a spare sector.

5. The method of claim 4 wherein said one of the spare sectors in which the address information is relocated is in a track associated with the same radial position of the heads, whereby no radial movement of the heads is required to relocate the address information in the spare sector.

6. The method of claim 5 further comprising the steps of: on addressing a sector in which an error flag has been recorded, reading out the address information from the track in which the spare sectors are located, comparing the address information with the addresses of the sector having the error flag to locate the spare sector.

7. A digital storage system comprising a plurality of coaxial rotatable magnetic disks, magnetic heads operatively associated with each disk surface, servo means responsive to a ditital cylinder number input for simultaneously positioning the heads at any selected one of a plurality of concentric track positions on the disk surfaces, switching means responsive to a digital head number input for connecting any selected one of the magnetic heads to a data input/output channel, the disks having the tracks divided into a plurality of numbered sectors, each sector having recorded thereon digital address information specifying the cylinder number, head number, and sector number of the sector, and control means responsive to input signals specifying the address of a selected sector for reading out recorded information from the sector identified by said address, the control means including means detecting any error in the recorded information read out from the addressed sector, means responsive to said detecting means when an error is detected for operating said switching means to switch the input/output channel to a particular head, and means for recording the same address information of the sector in which error was detected in one of the sectors of the track associated with said particular head.

8. Apparatus as defined in claim 7 wherein said control means further includes means responsive to said error detecting means for recording a unique error flag condition in the sector in which the error is detected.

9. Apparatus as defined in claim 8 wherein the control means further includes means responsive to the error flag condition when read off a disk for operating the switching means to switch the input/ouput channel to said particular head.

10. Apparatus as defined in claim 9 wherein the control means further includes means reading out from said particular magnetic head the address information in each of the sectors on the track associated with said particular head, means for comparing each of the addresss with said input signals to the control means specifying an address, the comparing means signaling when the address read out of a sector by said particular head is equal to the input address information.

* * * * *